(12) United States Patent
Pfister et al.

(10) Patent No.: US 10,815,860 B2
(45) Date of Patent: Oct. 27, 2020

(54) METHOD FOR MONITORING A NITROGEN OXIDE STORAGE CATALYST

(71) Applicant: Robert Bosch GmbH, Stuttgart (DE)

(72) Inventors: Tobias Pfister, Stuttgart (DE); Cornelia Nagel, Stuttgart (DE); Herbert Schoemig, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 30 days.

(21) Appl. No.: 16/278,428

(22) Filed: Feb. 18, 2019

(65) Prior Publication Data

US 2019/0257236 A1   Aug. 22, 2019

(30) Foreign Application Priority Data

Feb. 19, 2018   (DE) .......................... 10 2018 202 458

(51) Int. Cl.
*F01N 3/08*   (2006.01)
*F01N 11/00*   (2006.01)

(52) U.S. Cl.
CPC .......... *F01N 11/007* (2013.01); *F01N 3/0814* (2013.01); *F01N 3/0842* (2013.01); *F01N 11/00* (2013.01); *F01N 2550/03* (2013.01); *F01N 2560/025* (2013.01); *F01N 2570/14* (2013.01); *F01N 2900/1622* (2013.01)

(58) Field of Classification Search
CPC ...... F01N 3/0814; F01N 3/0842; F01N 11/00; F01N 11/007; F01N 2550/03; F01N 2570/14; F01N 2900/1618; F01N 2900/1622

See application file for complete search history.

(56) References Cited

U.S. PATENT DOCUMENTS

| 2003/0172645 A1* | 9/2003 | Schnaibel | ........... F02D 41/1482 |
| | | | 60/285 |
| 2015/0315946 A1* | 11/2015 | Matsumoto | ............. F01N 3/208 |
| | | | 422/119 |

\* cited by examiner

*Primary Examiner* — Audrey K Bradley
(74) *Attorney, Agent, or Firm* — Michael Best & Friedrich LLP

(57) ABSTRACT

A method for monitoring a nitrogen oxide storage catalyst in an exhaust system of an internal combustion engine, in which a reduction of nitrogen oxides is carried out by means of a reducing agent is disclosed. During a regeneration of the nitrogen oxide storage catalyst, the following steps are carried out: A measurement is carried out, from which a slip rate of the reducing agent not absorbed in the nitrogen oxide storage catalyst is ascertained. In addition, at least one expected value for the slip rate of the reducing agent is ascertained from at least one model. Subsequently, a computation of a monitoring variable is carried out by means of the slip rate of the reducing agent ascertained from the measurement and the at least one expected value for the slip rate of the reducing agent. Finally, a diagnosis of the storage capacity of the nitrogen oxide storage catalyst is carried out on the basis of the monitoring variable.

20 Claims, 3 Drawing Sheets

METHOD FOR MONITORING A NITROGEN OXIDE STORAGE CATALYST

BACKGROUND OF THE INVENTION

The present invention relates to a method for monitoring a nitrogen oxide storage catalyst in an exhaust system of an internal combustion engine. Furthermore, the invention relates to a computer program which executes every step of the method when it runs on a computer, and a machine-readable storage medium which stores the computer program. Finally, the invention relates to an electronic control unit which is configured to execute the method according to the invention.

Nitrogen oxide storage catalysts (NSC) are presently used in internal combustion engines to reduce the emission of nitrogen oxides (NOx). To save fuel, internal combustion engines are presently operated above all in a lean mode, in which the combustion air ratio $\lambda$ (air/fuel ratio) is greater than 1, i.e., more oxygen is introduced into the internal combustion engine than is required for complete combustion. As a result, an elevated concentration of nitrogen oxides is present in the exhaust gas in an internal combustion engine operated in the lean mode. The nitrogen oxide storage catalyst is arranged in an exhaust system of the internal combustion engine and absorbs nitrogen oxides from the exhaust gas emitted by the internal combustion engine and stores them.

From time to time, the nitrogen oxide storage catalyst has to be regenerated, i.e., the stored nitrogen oxide has to be removed from the nitrogen oxide storage catalyst. For this purpose, the internal combustion engine is operated in a rich mode using a combustion air ratio $\lambda$ less than 1, therefore less oxygen is introduced into the internal combustion engine than is required for complete combustion. As a result, the stored nitrogen oxide is reduced to form nitrogen, which is then exhausted via the exhaust system.

As an important component in pollutant reduction, the nitrogen oxide storage catalyst is monitored with respect to its storage capacity and its pollutant-reducing effect by means of an onboard diagnostic unit (OBD), to also meet legal requirements. In the monitoring, a so-called WPA pattern (worst part acceptable) and a so-called BPU pattern (best part unacceptable) are used for evaluating the functionality. If the nitrogen oxide storage catalyst reaches or exceeds judgment values provided in the WPA pattern, it can thus be evaluated as fully intact. If the nitrogen oxide storage catalyst falls below judgment values provided in the BPU pattern, it is thus to be judged as definitively defective. If the judgment values are between the WPA pattern and the BPU pattern, this thus indicates a damage to the storage catalyst, wherein the damage is still in an acceptable range in which service measures do not necessarily have to be carried out.

Methods are known in which the monitoring is based on a slip rate of a reducing agent during the regeneration of the nitrogen oxide storage catalyst. The slip rate reflects the ratio of a concentration, a mass flow, or a mass between the slipping reducing agent, i.e., the reducing agent which passes the exhaust gas posttreatment without reducing nitrogen oxides, and the supplied reducing agent. Such reducing agents are, for example, reducing exhaust gas components, such as hydrocarbons (HC), carbon monoxide (CO), and/or hydrogen ($H_2$). These reducing exhaust gas components increasingly occur during the regeneration of the nitrogen oxide storage catalyst, when the internal combustion engine is operated using a combustion air ratio less than 1. Damage to the nitrogen oxide storage catalyst causes, inter alia, a reduction of the reducing capability of the catalytic coating, which results in an increase of the slip rate. The slip rate of the reducing agent can typically be ascertained with the aid of a lambda probe arranged downstream of the nitrogen oxide storage catalyst.

Monitoring the nitrogen oxide storage catalyst is, on the one hand, only to take place under specific monitoring conditions, in which the highest possible accuracy of the diagnosis is possible, i.e., the spread of the diagnosis results is as small as possible. On the other hand, the diagnosis is to be carried out as often as possible. The quotient of cycles in which the monitoring was carried out and the total number of cycles in which the monitoring could have occurred is referred to as the IUMPR (in-use monitoring performance ratio) and is not to fall below a minimum value of 0.33 (successful monitoring in at least every third cycle) according to the law.

SUMMARY OF THE INVENTION

A method for monitoring a nitrogen oxide storage catalyst in an exhaust system of an internal combustion engine is proposed. The nitrogen oxide storage catalyst absorbs nitrogen oxides which are located in the exhaust gas emitted by the internal combustion engine and stores them. During the regeneration of the nitrogen oxide storage catalyst, the reduction of the nitrogen oxides is performed by means of a reducing agent to form nitrogen, which is then removed from the nitrogen oxide storage catalyst via the exhaust system. To regenerate the nitrogen oxide storage catalyst, the internal combustion engine can be operated in a rich mode, in which a combustion air ratio (air/fuel ratio) is less than 1. Reducing exhaust gas components, such as hydrocarbons (HC), carbon monoxide (CO), and/or hydrogen ($H_2$), which react with the nitrogen oxides and reduce them, are used as the reducing agents. These reducing exhaust gas components increasingly occur during the regeneration of the nitrogen oxide storage catalyst, when the internal combustion engine is operated using a combustion air ratio less than 1.

The method is based on a slip rate of the reducing agent which is not absorbed in the nitrogen oxide storage catalyst. The slip rate reflects the ratio of a concentration, a mass flow, or a mass between reducing agent which passes the nitrogen oxide storage catalyst without reducing nitrogen oxides, i.e., slipping reducing agent, and the supplied reducing agent. The slip rate is therefore a measure of the activity of the catalytic coating of the storage catalyst, which promotes the reduction reaction.

In the method, it is provided that the steps described hereafter are to be carried out during the regeneration of the nitrogen oxide storage catalyst:

On the one hand, a measurement is carried out, from which the slip rate of the reducing agent not absorbed in the nitrogen oxide storage catalyst is ascertained. The measurement, from which the slip rate of the reducing agent is ascertained, is preferably carried out as follows: A combustion air ratio upstream of the nitrogen oxide storage catalyst and a combustion air ratio downstream of the nitrogen oxide storage catalyst are measured, wherein the measurement of the respective combustion air ratio is preferably performed by a lambda sensor arranged at the respective point. Moreover, an exhaust gas mass flow is ascertained. Finally, the presently measured slip rate of the reducing agent is ascertained from the combustion air ratio downstream of the nitrogen oxide storage catalyst and the combustion air ratio upstream of the nitrogen oxide storage catalyst.

On the other hand, at least one expected value for the slip rate of the reducing agent is ascertained from at least one model. At least one of the following parameters can be used as parameters for the model:

The combustion air ratio upstream of the nitrogen oxide storage catalyst;
  a setpoint of the combustion air ratio upstream of the nitrogen oxide storage catalyst;
  a deviation between the combustion air ratio upstream of the nitrogen oxide storage catalyst and the abovementioned setpoint value;
  the exhaust gas mass flow;
  the temperature of the nitrogen oxide storage catalyst;
  the running consumption of the reducing agent, for example, the reducing exhaust gas components, since the regeneration start, as a measure of the regeneration progress;
  a nitrogen oxide load of the nitrogen oxide storage catalyst, i.e., the mass of nitrogen oxide stored in the nitrogen oxide storage catalyst; and/or
  a sulfur load of the exhaust gas, i.e., the mass of sulfur stored in the nitrogen oxide storage catalyst.

The running consumption of the reducing agent can be computed as the integral of the product from the difference of the reciprocal combustion air ratios upstream and downstream of the nitrogen oxide storage catalyst and the exhaust gas mass flow.

These parameters are preferably incorporated in the form of characteristic maps or characteristic curves into the model. Preferably, the combustion air ratio upstream of the nitrogen oxide storage catalyst and the deviation between this combustion air ratio and the setpoint value are incorporated as two-dimensional characteristic maps and the further parameters are incorporated as one-dimensional characteristic curves into the model. The measurement from which the slip rate of the reducing agent not absorbed in the nitrogen oxide storage catalyst is ascertained, and the ascertainment of the at least one expected value can be carried out in any arbitrary sequence and in particular also simultaneously with one another.

According to one aspect, one of the expected values is ascertained from a model for a WPA pattern (worst part acceptable), which represents an intact nitrogen oxide storage catalyst. In other words, the parameters of this model are selected so that they model an intact nitrogen oxide storage catalyst according to the WPA pattern. According to a further aspect, one of the expected values is ascertained from a model for a BPU pattern (best part unacceptable), which represents a defective nitrogen oxide storage catalyst. In other words, the parameters of this model are selected so that they model a defective nitrogen oxide storage catalyst according to the BPU pattern. Since the WPA pattern and the BPU pattern differ, the parameters are selected as adapted to the respective model.

A monitoring variable, in particular a scaled slip rate, is computed by means of the slip rate of the reducing agent ascertained from the measurement and the at least one expected value of the slip rate of the reducing agent. All ascertained expected values are advantageously incorporated in the computation of the monitoring variable. Finally, a diagnosis of the storage capacity of the nitrogen oxide storage catalyst is carried out on the basis of the monitoring variable. The monitoring variable, which was computed from a measured value and at least one modeled value for the slip rate of the reducing agent, indicates the difference between the measured slip rate and the expected value or the expected values of the slip rate of the reducing agent and is used as a variable for the diagnosis of the functionality of the nitrogen oxide storage catalyst. The monitoring variable can accordingly be used to differentiate between an intact nitrogen oxide storage catalyst and a defective nitrogen oxide storage catalyst. The monitoring variable offers the advantage moreover that a quantitative evaluation is also carried out during the diagnosis. The quantitative diagnosis is simple and informative for the combination described hereafter of above-described features.

If the abovementioned expected values for the slip rate according to the WPA pattern and according to the BPU pattern, in which the parameters of the model according to the WPA pattern differ from the parameters of the model according to the BPU pattern, are used in the computation of the monitoring variable, the values thereof can be classified in at least three value ranges: A first range of the monitoring variable represents a state of the nitrogen oxide storage catalyst which is diagnosed better than the state according to the WPA pattern, i.e., in which the nitrogen oxide storage catalyst is diagnosed as (completely) intact. A second range of the monitoring variable represents a state of the nitrogen oxide storage catalyst which is diagnosed worse than the state according to the WPA pattern but better than the state according to the BPU pattern. Accordingly, damage of the nitrogen oxide storage catalyst is present, but it is still under the level relevant for the BPU pattern, and the nitrogen oxide storage catalyst is diagnosed as (sufficiently) intact. A third range represents a state of the nitrogen oxide storage catalyst which is diagnosed worse than the state according to the BPU pattern, i.e., in which the nitrogen oxide storage catalyst is diagnosed as defective.

The monitoring variable may be computed in a particularly simple manner and informatively by dividing the difference between the measured slip rate and the expected value of the slip rate according to the WPA pattern by the difference between the expected value of the slip rate according to the BPU pattern and the expected value of the slip rate according to the WPA pattern, wherein the variables each relate to the same time. In this case, the value ranges can be selected particularly simply. Negative values of the monitoring variable form the first range, in which the nitrogen oxide storage catalyst is diagnosed as (completely) intact. Values between zero and one correspond to a state in the second range between the state according to the WPA pattern and the state according to the BPU pattern. Values greater than 1 form the third range, in which the nitrogen oxide storage catalyst is diagnosed as defective.

Alternatively, a separate mean value can be computed for the measured value and each of the expected values of the slip rate of the reducing agent. For this purpose, the slip rate for the reducing agent, which is ascertained from the respective model or measurement, is weighted, i.e., multiplied, with an available reducing agent mass flow, which can be computed during the regeneration of the nitrogen oxide storage catalyst in the rich mode of the internal combustion engine from the combustion air ratio upstream of the nitrogen oxide catalyst and the exhaust gas mass flow and accordingly represents the actual reducing agent flow upstream of the nitrogen oxide catalyst, and this value is subsequently integrated over time. The integration time preferably corresponds to the measuring time of the measurement, from which the slip rate of the reducing agent is ascertained. The respective integral reducing agent slip mass within the measuring time thus results. This value is then divided by the integrated available reducing agent mass flow, in order to obtain the associated mean value. As already mentioned, the mean values can be used instead of the instantaneous values of the slip rate during the computation of the monitoring variable. This means the monitoring variable is computed from the at least one model mean value and the averaged slip rate of the reducing agent from the measurement. The above-described value ranges for the monitoring variable can be selected in the same manner.

A selectivity expected value can optionally be ascertained from two of the expected values for different models, in particular from the expected value for the model according to the WPA pattern and from the expected value for the model according to the BPU pattern. The selectivity expected value corresponds to the value by which the two expected values differ for the two models having the respective parameters and is therefore a measure of the sensitivity in the present monitoring phase. The selectivity expected value can be compared to a threshold value for the selectivity. If the selectivity expected value is greater than the threshold value for the selectivity, the diagnosis is classified as valid, since the two models differ enough for a differentiation. If the selectivity expected value is less than the threshold value for the selectivity, the diagnosis is classified as invalid and discarded, since the differentiability between the two models is not sufficient for a valid diagnosis.

The computer program is configured to carry out every step of the method, in particular when it is carried out on a computer device or control unit. It enables the implementation of the method in a conventional electronic control unit, without having to perform structural modifications thereon. For this purpose, it is stored on the machine-readable storage medium.

The electronic control unit which is configured to carry out monitoring of the nitrogen oxide storage catalyst is obtained by installing the computer program on a conventional electronic control unit.

BRIEF DESCRIPTION OF THE DRAWINGS

Exemplary embodiments of the invention are illustrated in the drawings and explained in greater detail in the following description.

DETAILED DESCRIPTION

Figure 1:
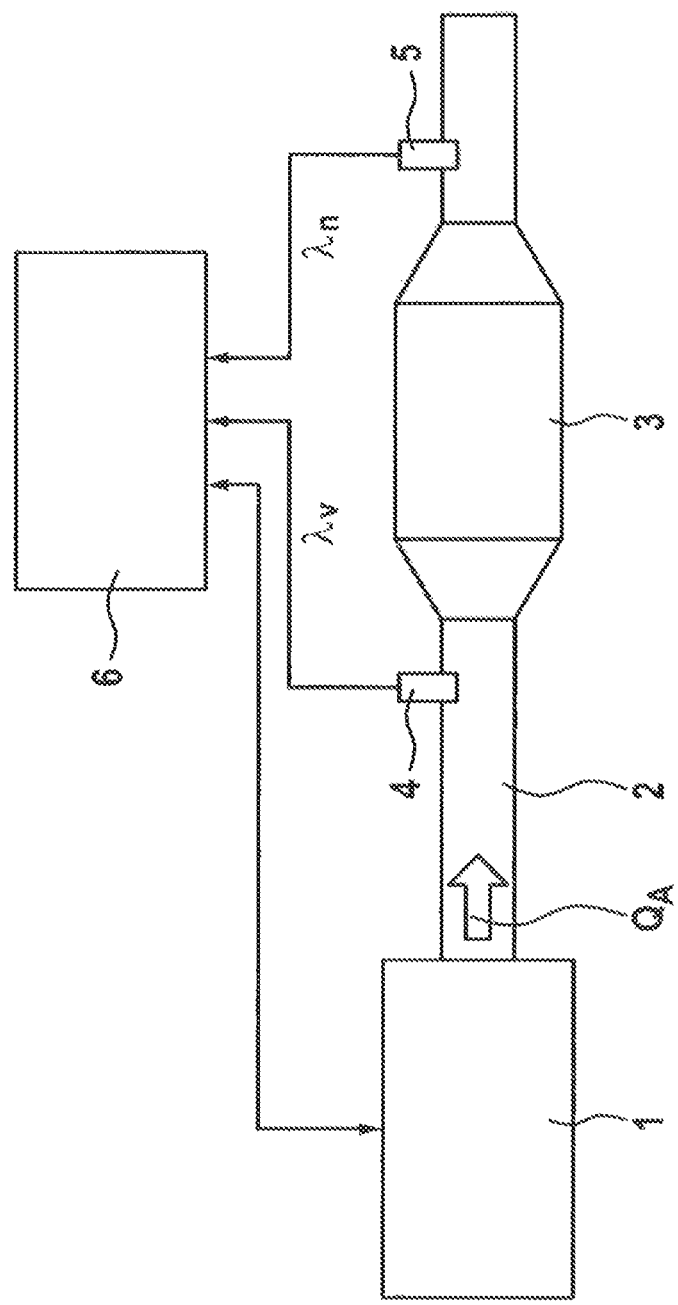
FIG. 1 shows a schematic illustration of a nitrogen oxide storage catalyst in an exhaust system of an internal combustion engine, which can be monitored by means of an embodiment of the method according to the invention.

FIG. 1 shows a schematic illustration of an internal combustion engine 1, an exhaust system 2, and an exhaust gas posttreatment unit having a nitrogen oxide storage catalyst 3, which can be monitored by means of one embodiment of the method according to the invention. An exhaust gas mass flow $Q_A$ from the internal combustion engine 1 is conducted via the exhaust system 2 to the exhaust gas posttreatment unit. The exhaust gas posttreatment unit can comprise, in addition to the nitrogen oxide storage catalyst 3, still further components for reducing pollutants, in particular nitrogen oxides.

An electronic control unit 6 controls the internal combustion engine 1, in particular its fuel injection (not shown separately). To save fuel, the internal combustion engine 1 is predominantly operated in a lean mode, in which more oxygen is present in the internal combustion engine 1 than is required for complete combustion of the fuel, so that an elevated concentration of nitrogen oxides is emitted by the internal combustion engine 1. The nitrogen oxides increasingly present in the exhaust gas in this mode are absorbed by the nitrogen oxide storage catalyst 3 and temporarily stored therein. To regenerate the nitrogen oxide storage catalyst 3, the internal combustion engine 1 is operated in a rich mode, in which less oxygen is present in the internal combustion engine 1 than is required for complete combustion of the fuel, so that hydrocarbons (HC), carbon monoxide (CO), and hydrogen ($H_2$) are increasingly emitted. These reducing exhaust gas components are used as reducing agents for the nitrogen oxides in the nitrogen oxide storage catalyst 3 and reduce them to form nitrogen, which subsequently leaves the exhaust system 2.

In addition, a first lambda sensor 4 is arranged upstream of the nitrogen oxide storage catalyst 3, which measures the combustion air ratio $\lambda_v$ upstream of the nitrogen oxide storage catalyst 3 and relays it to the electronic control unit 6. Furthermore, a second lambda sensor 5 is arranged downstream of the nitrogen oxide storage catalyst 3, which measures the combustion air ratio $\lambda_n$ downstream of the nitrogen oxide storage catalyst 3 and also relays it to the electronic control unit 6.

Figure 2:
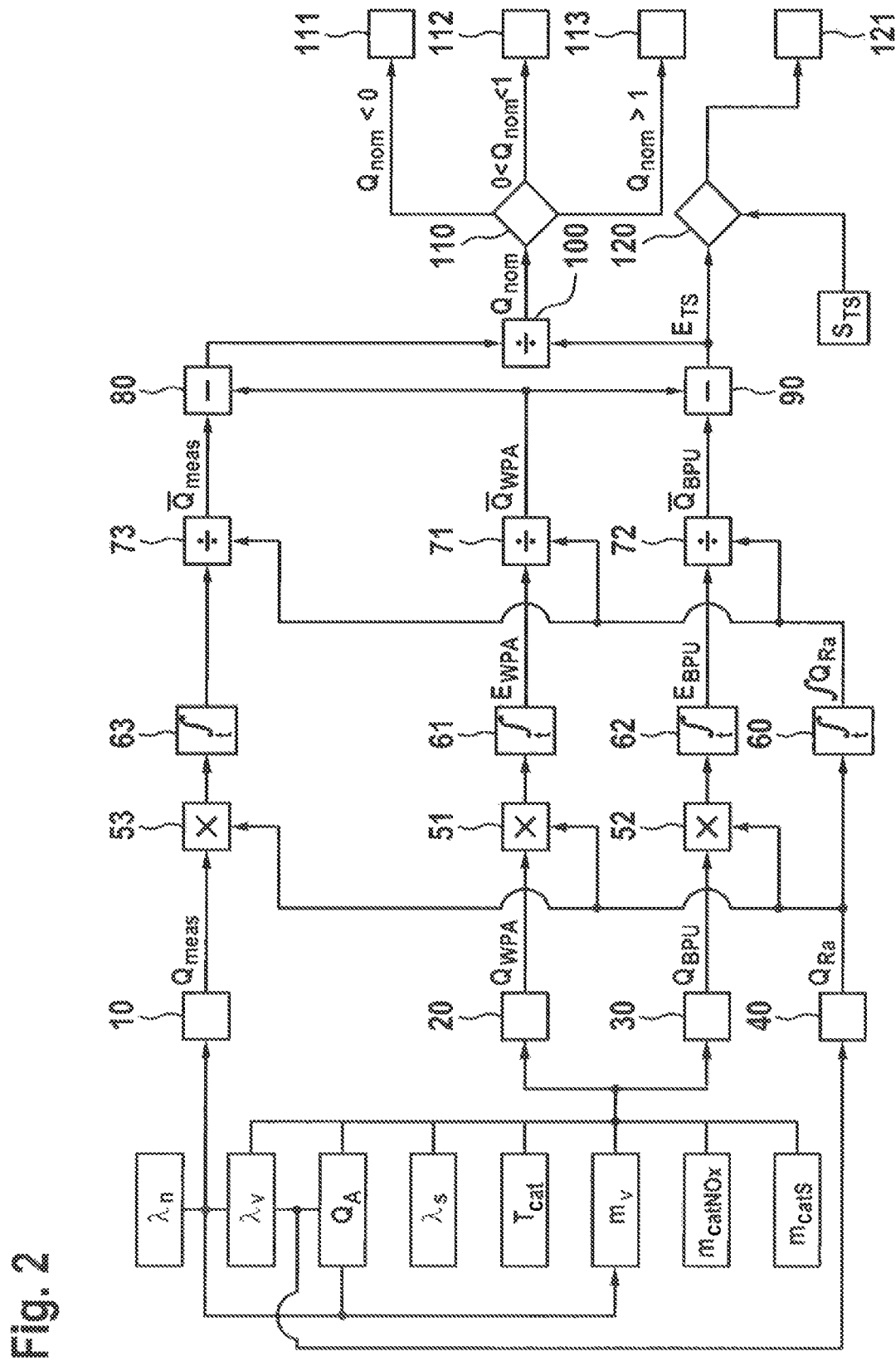
FIG. 2 shows a flow chart of an embodiment of the method according to the invention.

FIG. 2 shows a flow chart of an embodiment of the method according to the invention. During the regeneration of the nitrogen oxide storage catalyst 3, a measurement 10 of the combustion air ratio $\lambda_v$ upstream of the nitrogen oxide storage catalyst 3 and of the combustion air ratio $\lambda_n$ downstream of the nitrogen oxide storage catalyst 3 is carried out and a measured slip rate $Q_{meas}$ is ascertained therefrom according to formula 1.

$$Q_{meas} = \frac{\left(1 - \frac{1}{\lambda_n}\right)}{\left(1 - \frac{1}{\lambda_v}\right)} \quad \text{(Formula 1)}$$

In addition, a model 20 for the slip rate according to a WPA pattern (referred to in short as WPA model 20 hereafter) and a model 30 for the slip rate according to a BPU pattern (referred to as BPU model 30 in short hereafter) are provided. Reference is made to the embodiment of FIG. 3 for a more detailed description of the two models 20, 30. The following parameters are incorporated into each of the two models 20, 30, wherein the parameters for the WPA model 20 and the BPU model 30 differ:

The combustion air ratio $\lambda_v$ upstream of the nitrogen oxide storage catalyst 3;

a setpoint value $\lambda_s$ of the combustion air ratio $\lambda_v$ upstream of the nitrogen oxide storage catalyst;

a deviation $\Delta\lambda_{vs}$ between the combustion air ratio $\lambda_v$ upstream of the nitrogen oxide storage catalyst 3 and the setpoint value $\lambda_s$;

the exhaust gas mass flow $Q_A$;

the temperature $T_{cat}$ of the nitrogen oxide storage catalyst 3;

the running consumption $m_v$ of the reducing agent since regeneration start as a measure of the regeneration progress;

the mass $m_{catNOx}$ of the nitrogen oxides stored in the nitrogen oxide storage catalyst 3; and/or the mass $m_{catS}$ of sulfur stored in the nitrogen oxide storage catalyst 3.

The running consumption $m_V$ of the reducing agent is computed as the integral of the product from the difference between the reciprocal combustion air ratio $\lambda_v$ upstream of the nitrogen oxide storage catalyst 3 and the reciprocal combustion air ratio $\lambda_n$ downstream of the nitrogen oxide storage catalyst 3 and the exhaust gas mass flow $Q_A$ according to formula 2. The integration start corresponds in this case to the time $t_0$ from which the combustion air ratio $\lambda_v$ upstream of the nitrogen oxide storage catalyst 3 is less than 1.

$$m_V = \int_{t_0}^{t} \left( \frac{1}{\lambda_v} - \frac{1}{\lambda_n} \right) \cdot Q_A \qquad \text{(Formula 2)}$$

A modeled slip rate $Q_{WPA}$ according to the WPA pattern is ascertained from the WPA model 20 and a modeled slip rate $Q_{BPU}$ according to the BPU pattern is ascertained from the BPU model 30. Furthermore, an available reducing agent mass flow $Q_{Ra}$ is ascertained 40 from the combustion air ratio $\lambda_v$ upstream of the nitrogen oxide storage catalyst 3 and the exhaust gas mass flow $Q_A$. The ascertainment of the modeled slip rate $Q_{WPA}$ according to the WPA pattern and the ascertainment of the modeled slip rate $Q_{BPU}$ according to the BPU pattern and also the ascertainment 40 of the reducing agent mass flow $Q_{Ra}$ may be carried out simultaneously with one another and/or with the measurement 10 of the measured slip rate $Q_{meas}$ or in arbitrary sequence.

An expected value $E_{WPA}$ for the integral reducing agent slip mass of the WPA model 20 is ascertained by multiplying 51 the modeled slip rate $Q_{WPA}$ according to the WPA pattern with the available reducing agent mass flow $Q_{Ra}$ and subsequently integrating 61 the product over the measuring time t of the measurement 10. Similarly, an expected value $E_{BPU}$ for the BPU model 30 is ascertained by multiplying 52 the modeled slip rate $Q_{BPU}$ according to the BPU pattern with the available reducing agent mass flow $Q_{Ra}$ and subsequently integrating 62 the product over the measuring time of the measurement 10. Moreover, the available reducing agent mass flow $Q_{Ra}$ is also integrated 60 over the measuring time t of the measurement 10. By means of a division 71 of the expected value $E_{WPA}$ for the integral reducing agent slip mass of the WPA model 20 by the integrated available reducing agent mass flow $\int Q_{Ra}$, a mean value $\overline{Q}_{WPA}$ of the modeled slip rate $Q_{WPA}$ is obtained according to the WPA model 20 (referred to hereafter as "mean value $\overline{Q}_{WPA}$ for the WPA model"). Similarly, by means of the division 72 of the expected value $E_{BPU}$ for the BPU model 20 by the integrated available reducing agent mass flow $\int Q_{Ra}$, a mean value $\overline{Q}_{BPU}$ of the modeled slip rate $Q_{BPU}$ is obtained according to the BPU model 20 (referred to hereafter as the "mean value $\overline{Q}_{BPU}$ for the BPU model"). In the same manner, a mean value $\overline{Q}_{meas}$ of the measured slip rate $Q_{meas}$ is obtained by multiplying 53 the measured slip rate $Q_{meas}$ with the available reducing agent mass flow $Q_{Ra}$, subsequently integrating 63 over the measuring time t of the measurement 10, and finally dividing 73 by the integrated available reducing agent mass flow $\int Q_{Ra}$. The integrations 60-63 are carried out simultaneously but can also be carried out in any arbitrary sequence.

Now the difference 80 between the mean value $\overline{Q}_{meas}$ of the measured slip rate and the mean value $\overline{Q}_{WPA}$ for the WPA model 20 is calculated, on the one hand, and the difference 90 between the mean value $\overline{Q}_{BPU}$ for the BPU model and the mean value $\overline{Q}_{WPA}$ for the WPA model is calculated, on the other hand, wherein the difference 90 between the mean value $\overline{Q}_{BPU}$ for the BPU model and the mean value $\overline{Q}_{WPA}$ for the WPA model represent a selectivity expected value $E_{TS}$, the function of which will be explained hereafter. To finally obtain a monitoring variable, in this embodiment a scaled slip rate $Q_{norm}$, which reflects the degree of damage of the nitrogen oxide storage catalyst 3, a division 100 is carried out of the difference 80 between the mean value $\overline{Q}_{meas}$ of the measured slip rate and the mean value $\overline{Q}_{WPA}$ for the WPA model 20 by the difference 90 between the mean value $\overline{Q}_{BPU}$ for the BPU model and the mean value $\overline{Q}_{WPA}$ for the WPA model according to following formula 3:

$$Q_{norm} = \frac{\overline{Q}_{meas} - \overline{Q}_{WPA}}{\overline{Q}_{BPU} - \overline{Q}_{WPA}} \qquad \text{(Formula 3)}$$

Finally, a diagnosis 110 is carried out on the basis of the scaled slip rate $Q_{norm}$. For this purpose, it is checked which value range the scaled slip rate $Q_{norm}$ is in. If the scaled slip rate $Q_{norm}$ is in a first range less than zero, i.e., if the scaled slip rate $Q_{norm}$ assumes negative values, the state of the nitrogen oxide storage catalyst 3 is diagnosed as better than a state according to the WPA pattern, i.e., the nitrogen oxide storage catalyst is diagnosed 111 as completely intact. If the scaled slip rate $Q_{norm}$ is in a second range between zero and one, the state of the nitrogen oxide storage catalyst 3 is thus diagnosed as worse than the state according to the WPA pattern but better than the state according to the BPU pattern. Accordingly, there is damage of the nitrogen oxide storage catalyst 3, but this damage is still under the level relevant for the BPU pattern, and the nitrogen oxide storage catalyst is diagnosed 112 as sufficiently intact. If the scaled slip rate $Q_{norm}$ is in a third range greater than one, the state of the nitrogen oxide storage catalyst 3 is thus diagnosed as worse than the state according to the BPU pattern, i.e., the nitrogen oxide storage catalyst 3 is diagnosed 113 as defective.

In addition, the selectivity expected value $E_{TS}$, which is a measure of the sensitivity in the present monitoring phase, is compared to a threshold value $S_{TS}$. If the selectivity expected value $E_{TS}$ is greater than the threshold value $S_{TS}$ for the selectivity, the diagnosis 110 is thus classified as valid. If the selectivity expected value $E_{TS}$ is less than the threshold value $S_{TS}$ for the selectivity, however, the diagnosis 110 is thus classified 121 as invalid and the above-described result is discarded.

Figure 3:
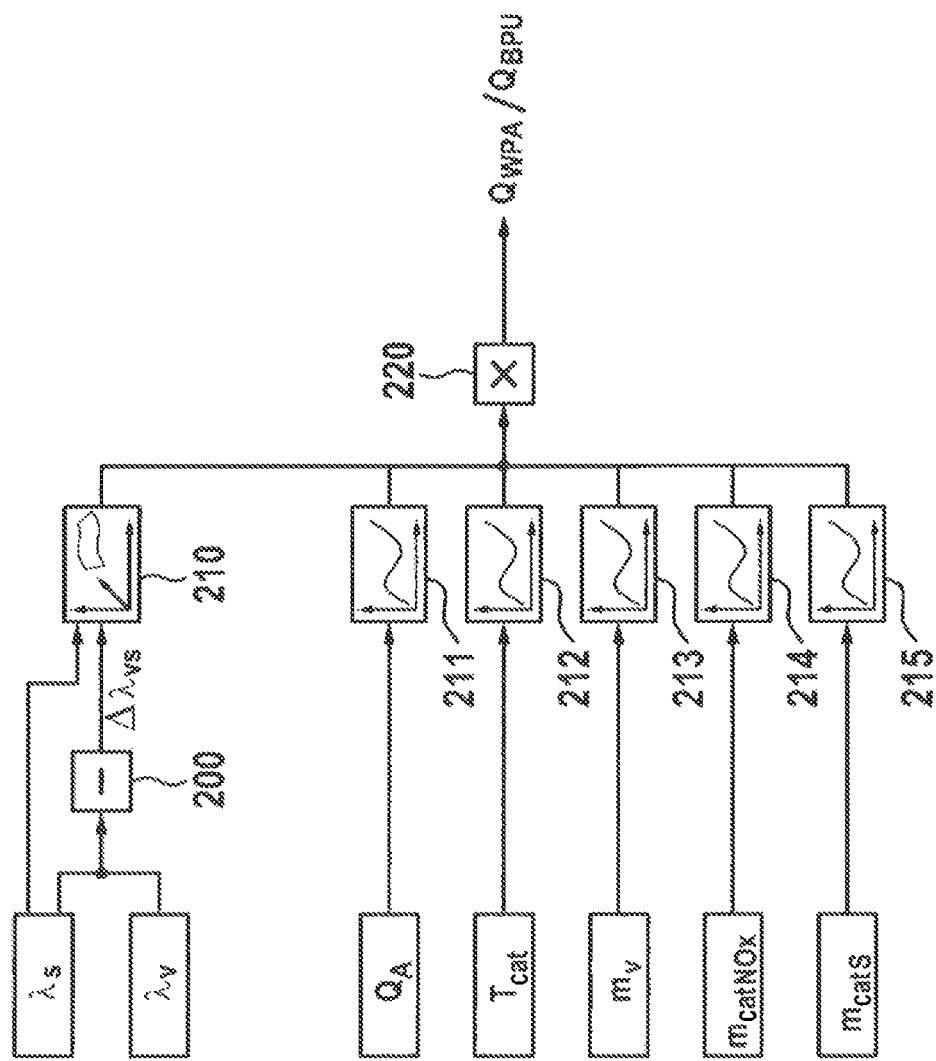
FIG. 3 shows a flow chart of the ascertainment of models as are used in the embodiment of the method according to the invention in FIG. 2.

FIG. 3 shows a flow chart for ascertaining the models 20, 30 according to one embodiment of the method according to the invention. The ascertainment described hereafter can be applied similarly for the model 20 according to the WPA pattern and for the model 30 according to the BPU pattern, only the parameters described hereafter are selected and/or weighted differently in the two patterns. Characteristic maps or characteristic curves 210-215 are used to transfer the parameters into the modeled slip rate $Q_{WPA}$ or $Q_{BPU}$. The characteristic curves 210-215 are assigned different data, whereby the parameters are weighted differently. At the beginning, a deviation $\Delta\lambda_{vs}$ between the combustion air ratio $\lambda_v$ upstream of the nitrogen oxide storage catalyst 3 and the setpoint value $\lambda_s$ for the combustion air ratio $\lambda_v$ downstream of the nitrogen oxide storage catalyst 3 is ascertained by calculating a difference 200 between the two variables. A two-dimensional characteristic map 210 indicates a model base value for the slip rate as a function of the setpoint value $\lambda_s$ for the combustion air ratio and the deviation $\Delta\lambda_{vs}$ between the combustion air ratio $\lambda_v$ and the setpoint value $\lambda_s$. Separate one-dimensional characteristic curves 211-215 are applied in each case for the exhaust gas mass flow $Q_A$, the temperature $T_{cat}$ of the nitrogen oxide storage catalyst 3, the present consumption $m_V$ of the reducing agent, the mass $m_{catNOx}$ of the nitrogen oxides and the mass $m_{catS}$ of sulfur, which are stored in the nitrogen oxide storage catalyst, and the obtained values are then multiplied 220 in the form of correction factors with the model base value for the slip rate, to obtain the modeled slip rate $Q_{WPA}$ or $Q_{BPU}$, respectively, for the respective pattern.

The invention claimed is:

1. A monitoring method, wherein during a removal of nitrogen oxide from a nitrogen oxide storage catalyst (3), the method comprises:
   measuring, by an upstream sensor (4) that is arranged upstream of the nitrogen oxide storage catalyst (3), an upstream combustion air ratio (w) in an exhaust gas mass flow ($Q_A$) upstream of the nitrogen oxide storage catalyst (3);
   measuring, by a downstream sensor (5) that is arranged downstream of the nitrogen oxide storage catalyst (3), a downstream combustion air ratio (w) in the exhaust gas mass flow ($Q_A$) downstream of the nitrogen oxide storage catalyst (3);
   ascertaining (10), by the electronic control unit (6) when the electronic control unit (6) processes the upstream combustion air ratio (w) and the downstream combustion air ratio (w), a measured slip rate ($Q_{meas}$) of a reducing agent not absorbed in the nitrogen oxide storage catalyst (3);
   ascertaining (61, 62), by the electronic control unit (6), at least one expected value ($E_{WPA}$, $E_{BPU}$) for the measured slip rate ($Q_{meas}$);
   ascertaining (100), by the electronic control unit (6) when the electronic control unit (6) processes the measured slip rate ($Q_{meas}$) and the at least one expected value ($E_{WPA}$, $E_{BPU}$), a monitoring variable ($Q_{norm}$); and
   diagnosing (110), by the electronic control unit (6) when the electronic control unit (6) processes the monitoring variable ($Q_{norm}$), a storage capacity of the nitrogen oxide storage catalyst (3).

2. The monitoring method according to claim 1, the measurement information comprises a combustion air ratio ($\lambda_v$) upstream of the nitrogen oxide storage catalyst (3).

3. The monitoring method according to claim 1, the measurement information comprises a combustion air ratio ($\lambda_n$) downstream of the nitrogen oxide storage catalyst (3).

4. The monitoring method according to claim 1, wherein the at least one model (20) represents an intact nitrogen oxide storage catalyst (3).

5. The monitoring method according to claim 1, wherein the at least one model (30) represents a defective nitrogen oxide storage catalyst (3).

6. The monitoring method according to claim 1, wherein the reducing agent carries out a reduction of nitrogen oxides, the reduction of nitrogen oxides is performed during a removal of the nitrogen oxide.

7. The monitoring method according to claim 1, wherein ascertaining (61, 62) the at least one expected value ($E_{WPA}$, $E_{BPU}$) comprises ascertaining, by the electronic control unit (6), at least one parameter from at least one model (20, 30).

8. The monitoring method according to claim 7, wherein the at least one parameter is incorporated into the at least one model (20, 30) as a characteristic map (210) or a characteristic curve (211-215).

9. The monitoring method according to claim 7, wherein the at least one parameter is from the group consisting of: the upstream combustion air ratio ($\lambda_v$),
   a setpoint value ($\lambda_s$) of the combustion air ratio ($\lambda_v$),
   a deviation ($\Delta\lambda_{vs}$) between the combustion air ratio ($\lambda_v$) and the setpoint value ($\lambda_s$),
   an exhaust gas mass flow ($Q_A$),
   a temperature ($T_{cat}$) of the nitrogen oxide storage catalyst (3),
   a running consumption ($m_V$) of the reducing agent since regeneration start as a measure of regeneration progress,
   a nitrogen oxide load ($m_{catS}$) of the nitrogen oxide storage catalyst (3), and
   a sulfur load ($m_{catNOx}$) of the nitrogen oxide storage catalyst (3).

10. The monitoring method according to claim 1, wherein ascertaining (61, 62) the at least one expected value ($E_{WPA}$, $E_{BPU}$) further comprises:
    ascertaining, by the electronic control unit (6) from the at least one model (20, 30), a modeled slip rate ($Q_{WPA}$, $Q_{BPU}$) of the reducing agent not absorbed in the nitrogen oxide storage catalyst (3).

11. The monitoring method according to claim 10, wherein ascertaining (61, 62) the at least one expected value ($E_{WPA}$, $E_{BPU}$) further comprises:
    multiplying (51, 52), by the electronic control unit (6), an available reducing agent flow ($Q_{Ra}$) with the modeled slip rate ($Q_{WPA}$, $Q_{BPU}$) in a manner that permits the electronic control unit (6) to obtain a product.

12. The monitoring method according to claim 11, wherein ascertaining (61, 62) the at least one expected value ($E_{WPA}$, $E_{BPU}$) further comprises:
    integrating (61, 62), over time by the electronic control unit (6), the product in a manner that permits the electronic control unit (6) to obtain the at least one expected value ($E_{WPA}$, $E_{BPU}$).

13. The monitoring method according to claim 11, further comprising:
    ascertaining (71, 72), by the electronic control unit (6) from the available reducing agent flow ($Q_{Ra}$) and the at least one expected values ($E_{WPA}$, $E_{BPU}$), a mean value ($\overline{Q}_{WPA}$, $\overline{Q}_{BPU}$) for the at least one model (20, 30).

14. The monitoring method according to claim 13, further comprising:
    ascertaining, by the electronic control unit (6) from the available reducing agent flow ($Q_{Ra}$) and the measured slip rate ($Q_{meas}$), mean slip rate ($\overline{Q}_{meas}$) of f the reducing agent.

15. The monitoring method according to claim 13, further comprising:
    ascertaining (90), by the electronic control unit (6) from the mean value ($\overline{Q}_{WPA}$, $\overline{Q}_{BPU}$), a selectivity expected value ($E_{TS}$).

16. The monitoring method according to claim 15, further comprising:
    comparing (120), by the electronic control unit (6), the selectivity expected value ($E_{TS}$) with a threshold value ($S_{TS}$) in a manner that permits the electronic control unit (6) to determine whether the selectivity expected value ($E_{TS}$) is greater than the threshold value ($S_{TS}$).

17. A non-transitory computer-readable storage medium containing instructions that, when executed by the electronic control unit (6), permits the electronic control unit (6) to perform the monitoring method according to claim 1.

18. An electronic computer device comprising:

an electronic control unit (6) that is electrically connectable to:

- an upstream sensor (4) that measures an upstream combustion air ratio ($\lambda_v$) in an exhaust gas mass flow ($Q_A$) upstream of a nitrogen oxide storage catalyst (3), the upstream sensor (4) is arranged upstream of the nitrogen oxide storage catalyst (3), and
- a downstream sensor (5) that measures a downstream combustion air ratio ($\lambda_n$) in the exhaust gas mass flow ($Q_A$) downstream of the nitrogen oxide storage catalyst (3), the downstream sensor (5) is arranged downstream of the nitrogen oxide storage catalyst (3), wherein the electronic control unit (6) is configured to monitor the nitrogen oxide storage catalyst (3) by:

- processing, during a removal of nitrogen oxide from the nitrogen oxide storage catalyst (3), the upstream combustion air ratio ($\lambda_v$) and the downstream combustion air ratio ($\lambda_v$) to ascertain (10) a measured slip rate ($Q_{meas}$) of a reducing agent not absorbed in the nitrogen oxide storage catalyst (3),
- ascertaining (61, 62), during the removal of nitrogen oxide from the nitrogen oxide storage catalyst (3), at least one expected value ($E_{WP4}$, $E_{BPU}$) for the measured slip rate ($Q_{meas}$),
- processing, during the removal of nitrogen oxide from the nitrogen oxide storage catalyst (3), the measured slip rate ($Q_{meas}$) and the at least one expected value ($E_{WP4}$, $E_{BPU}$) in a manner that permits the electronic control unit (6) to ascertain (100) a monitoring variable ($Q_{norm}$); and
- processing, during the removal of nitrogen oxide from the nitrogen oxide storage catalyst (3), the monitoring variable ($Q_{norm}$) in a manner that permits the electronic control unit (6) to diagnose (110) a storage capacity of the nitrogen oxide storage catalyst (3).

19. The electronic computer device according to claim 18, wherein the nitrogen oxide storage catalyst (3) is in an exhaust system (2) of an internal combustion engine (1).

20. The electronic computer device according to claim 18, wherein, during the removal of nitrogen oxide from the nitrogen oxide storage catalyst (3), the reducing agent reduces nitrogen oxides.

* * * * *